United States Patent [19]

Cooperman et al.

[11] Patent Number: 4,638,473

[45] Date of Patent: Jan. 20, 1987

[54] TWO WIRE BIDIRECTIONAL DIGITAL TRANSMISSION SYSTEM

[75] Inventors: Michael Cooperman, Framingham; Richard W. Sieber, Attleboro, both of Mass.

[73] Assignee: GTE Laboratories Incorporated, Waltham, Mass.

[21] Appl. No.: 687,372

[22] Filed: Dec. 28, 1984

[51] Int. Cl.$^4$ ............................................. H04B 1/56
[52] U.S. Cl. ......................................... 370/27; 370/32
[58] Field of Search ............................. 370/27, 32, 24

[56] References Cited

U.S. PATENT DOCUMENTS

| | | | |
|---|---|---|---|
| 3,730,993 | 5/1973 | Moriyasu | 370/27 |
| 4,117,277 | 9/1978 | van den Elzen et al. | 179/170.6 |
| 4,162,371 | 7/1979 | Belforte | 370/27 |
| 4,237,463 | 10/1978 | Bjor et al. | 370/27 |
| 4,393,494 | 12/1980 | Belforte et al. | 370/27 |

OTHER PUBLICATIONS

"Full-Duplex Communication Over a Single Wire", Charles Green, *Digital Design*, 5/82.

Primary Examiner—Robert L. Griffin
Assistant Examiner—M. Huseman
Attorney, Agent, or Firm—Hamilton, Brook, Smith & Reynolds

[57] ABSTRACT

A two-wire bidirectional transmission system for transmitting electrical signals simultaneously in opposite directions between terminals over a pair of wires wherein the transmitter at one terminal transmits a voltage signal over one of said wires while the transmitter at the second terminal generates a voltage signal over the same wire, the second wire being grounded at each end. Impedance matching resistors, that is resistors matched to the impedance of the two wires, are coupled between each of the transmitters and the wire upon which the voltage signal is generated. A subtractor circuit is provided at each of the terminals for linearly subtracting a signal proportional to one-half of the voltage transmitted and thereby receiving at each terminal a voltage signal equal to one-half of the voltage transmitted by the opposite terminal.

5 Claims, 7 Drawing Figures

TWO WIRE BIDIRECTIONAL DIGITAL TRANSMISSION SYSTEM

DESCRIPTION

1. Technical Field

The present invention relates to digital transmission systems and, more particularly, to a private automatic branch exchange for switching and transmitting digital signals between a plurality of telephone/data terminals and a central switching system.

2. Background Art

Present day electronic Private Automatic Branch Exchanges (PABX) are relatively bulky, costly and consume considerable power. These shortcomings can be lessened by fabricating a PABX using state-of-the-art Very Large Scale Integrated Circuit (VLSI) technology. VLSI technology can provide over ½ million transistors in a single chip. However, in order to realize the full potential of VLSI technology in the fabrication of a PABX, a number of problems must be avoided in the process.

While VLSI chips can perform highly complex functions, the level of complexity required for incorporation of a PABX on a single chip can be increased significantly by using circuit structures with regular features, such as RAMS (Random Access Memories), ROMS (Read Only Memories) and PLA's (Program Logic Arrays).

Conventional PABX utilize time division multiplexed (TDM) digital bit streams of pulsed code modulated (PCM) words in which voice or data information is digitally encoded for communication. In some such systems, RAM's are used to store the information as to which bit or bits is to be multiplexed or demultiplexed on or off the bit stream. (See for example, U.S. Pat. No. 4,432,087 to Hubbard issued Feb. 14, 1984.) Multiplexing is accomplished by shifting data from the bit stream into shift registers at a low rate and sequentially shifting data out of the registers at a high rate. Where a large amount of information must be multiplexed/demultiplexed, as in PABX applications, the conventional approach results in use of many shift registers with attendant interconnection complexity and relatively large power dissipation.

Digital communication between the subscribers and the PABX is preferably achieved by conventional twisted pair wires with line driver transceivers at each end. It is desirable to be able to communicate in both directions, i.e., bidirectional transmission, to avoid the added cost of additional wiring or the requirement of time sharing one pair of wires and thus reducing the one-way transmission capacity.

DISCLOSURE OF THE INVENTION

The foregoing problems have been solved in the present system by an interrelated combination involving several steps and improved devices. One step is the use of a plurality of local PABX's to handle a large but limited number of subscribers within a limited geographical area. The local PABX's are capable of being fabricated in VLSI technology on a single chip, to provide voice and data exchange capability to a plurality of subscribers. The subscribers transmit digitally encoded speech signals and/or digitally encoded data in the conventional manner to the local PABX. The local PABX time division multiplexes (TDM's) each subscriber's signal and transmits the plurality of subscriber's signals to a central exchange for transmittal and reception to and from a plurality of other local single chip PABX's.

In the preferred embodiment, a single local PABX is capable of handling up to forty such subscribers. The connection between the telephone/data terminals and the local PABX employs a twisted pair wire operating in a time division duplex mode. Because the local PABX serves a relatively small number of subscribers in a relatively small geographical area, it can be located within a few hundred feet of each telephone data terminal pair. This results in a considerable reduction of the telephone line length between the subscriber and the PABX, which results in numerous advantages, such as reduced installation cost, reduced line attenuation and cross-talk. Synchronization between the transmitted and received signals is simplified, since the transmission delay is small, compared to the period of the transmitted bit. This eliminates the need for asynchronous receivers with the associated power dissipation and chip area consumption of such receivers.

The short distance, and hence short time delay, between transmission and receipt of signals to and from the local PABX chip and the subscriber's telephone makes it possible, in accordance with the invention, to employ a novel highly efficient apparatus and process for serial-to-parallel conversion. This conversion apparatus accomplishes time division, multiplexing and demultiplexing using a single memory array for all subscribers in which reading is performed orthogonally to writing, hereinafter referred to as "orthogonal memory" or "orthogonal RAMS". Each orthogonal memory, in addition to multiplexing or demultiplexing, provides storage and serial-to-parallel or parallel-to-serial conversion in a regular and compact structure highly suitable for VLSI fabrication techniques.

Use of orthogonal memory in this manner eliminates the necessity of having four bit shift stages for each bit sent from a subscriber. In the preferred embodiment 40, such subscribers are handled per PABX chip. Thirty-two hundred shift bit register stages may thus be eliminated by utilizing the orthogonal memory array of the invention. Eliminating such a large shift register requirement is a major step in making it possible to fabricate a PABX on a single chip.

Further, in the preferred embodiment of the invention, communication between the local PABX and the telephone data line is accomplished by transmitting and receiving signals over one pair of wires at the same time, thus eliminating the requirement of two pair of wires or the cost of time sharing one pair of wires and reducing the one-way transmission capacity. In this two-wire bidirectional transmission apparatus, the line driver at one end of the line, say the PABX line driver, has an internal impedance matched to the characteristic impedance of the transmission line which is typically 100 ohms. Similarly, the internal impedance of the line driver at the other end, the telephone data terminal end, is a 100 ohm impedance matched to the 100 ohms characteristic impedance of the twisted pair transmission line. Thus, as the transmitted voltage signal is sent simultaneously by each opposite line driver, in opposite directions down the line, the following occurs:

1) The output from the PABX driver is attenuated by a factor of two, since the internal impedance of the driver and the characteristic impedance of the transmission line form a two-to-one attenuator. Thus the output signal from the PABX driver is VA/2 wherein VA=-PABX line driver voltage output. Similarly, the output signal from the telephone line driver is VB/2. VB/2 arrives at the PABX side as VBD/2 (wherein "VBD/2" is the delayed and attenuated version of the telephone transmitted signal VB/2.) The same effect occurs on the PABX side of the transmission line, wherein the received signal is VBD/2.

Since VBD/2 is the desired signal at the PABX side, this signal may be separated from the combined received and transmitted signal (VBD/2+VA/2) by subtracting out VA/2. Similarly, at the telephone receiving side, VB/2 may be subtracted out of the received signal leaving VAD/2, which is the desired delayed version of VA.

BRIEF DESCRIPTION OF THE DRAWINGS

The invention will be more fully appreciated from the following detailed description when considered in connection with the accompanying drawings in which.

BEST MODE OF CARRYING OUT THE INVENTION

I. Low Power Line Driving

Figure 1:
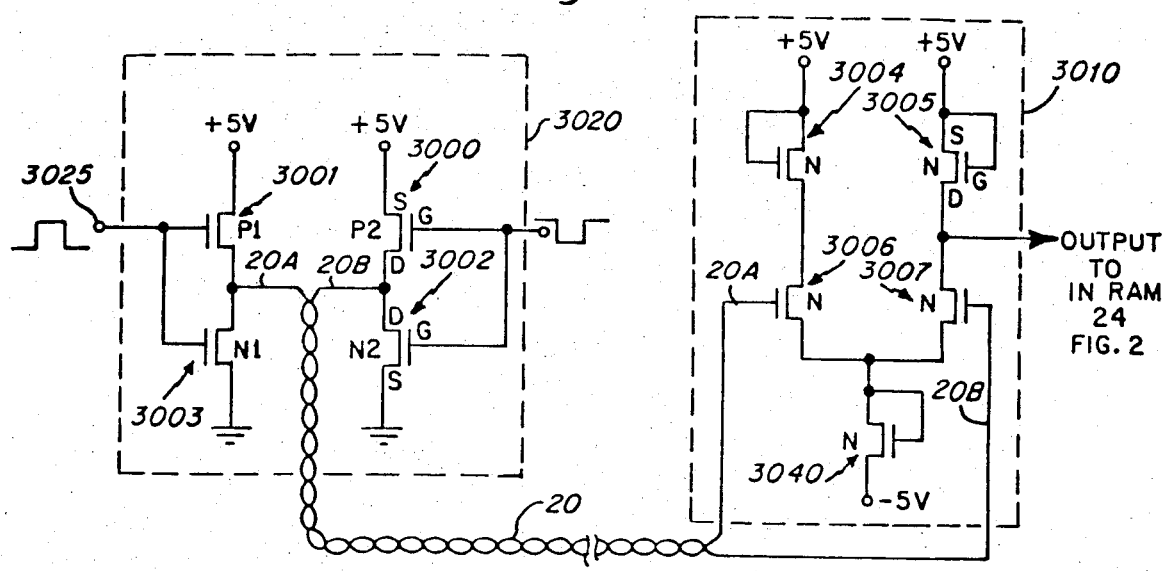
FIG. 1 is a schematic of the line low-power line drivers of the invention.

FIG. 1 shows a differential transceiver 3010 at the receiving end, i.e., the PABX end, and a differential driver 3020 at the sending end, in this case, the telephone subscriber's end. However, it is to be understood that the two ends are interchangeable. The differential driver 3020 consists of two P/N MOS transistor pairs 3001 and 3003, forming one pair, and 3000 and 3002, forming the second pair. The source terminal of transistors 3000 and 3001 is coupled to +5 volts and the source terminal of transistors 3002 and 3003 is coupled to ground. Twisted wire transmission line 20 has one wire 20A coupled to the intersection of the drain terminals of respective transistors 3001 and 3003, while the drain terminals of respective transistors 3000 and 3002 are coupled to the other wire 20B. The information bit stream at terminal 3025 is coupled to the gate terminals of transistors 3003 and 3001 and the negative or reciprocal of the bit stream is coupled to the gates of transistors 3000 and 3002, thereby differentially driving the transistor pairs and hence the transmission line 20.

Figure 2:
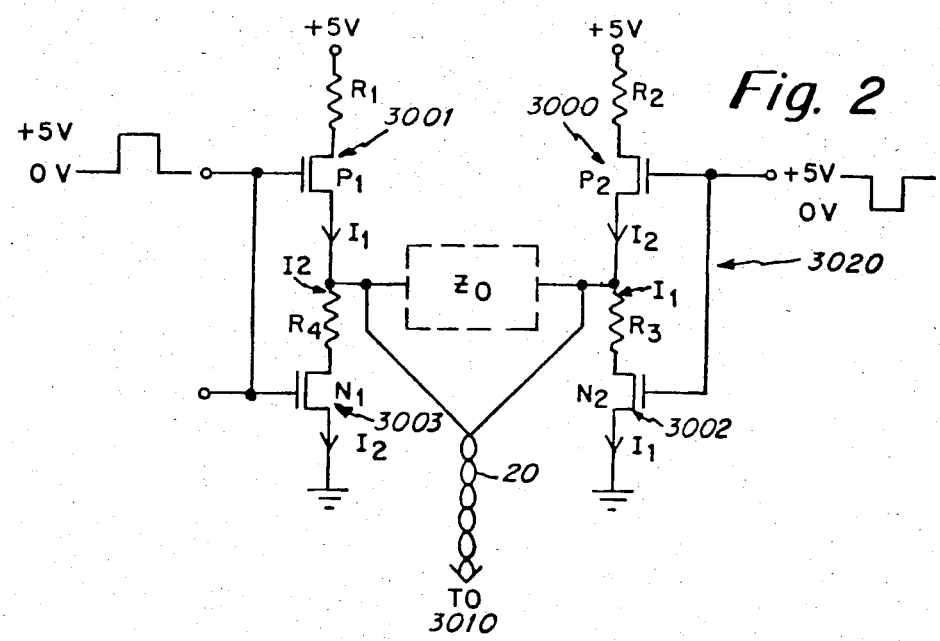
FIG. 2 is an equivalent circuit of the circuit shown in FIG. 1.

The equivalent circuit for the differential line driver 3020 of FIG. 1 is shown in FIG. 2. The two figures may be used to show that the sending end termination circuit line driver dissipates power only during logical transitions of the input signals on the wires 20a and 20b, comprising the wire pair 20.

The receiving end of transmission line 20 is coupled across the gates of N-MOS transistors 3006 and 3007, which present a high input impedance, thus effectively providing an open circuit at the receiving end.

The characteristic impedance $Z_0$ of line 20 is typically 100 ohms. The transistor pair geometries are selected to provide a drain-source resistance of $\frac{1}{2}Z_0$ or 50 ohms. The line driver 3020 sending end circuit has a source impedance of 100 ohms matched to the line impedance $Z_0$; and is thus considered to be terminated at the sending end. The result of this arrangement is summarized in Table I below:

TABLE I

| Time | Sending end Termination Sending End | Receiving End |
|---|---|---|
| $0 < T < T_D$ | $V = \frac{EZ_0}{R + Z_0} = \frac{E}{2} = 2.5 \text{ V}$ | $V = 0$ |
| | $I = \frac{E - E/2}{R} = \frac{E}{2R} = 25 \text{ mA}$ | $I = 0$ |
| $T_D < 1 < 2T_D$ | $V = \frac{E}{2} = 2.5 \text{ V}$ | $V = 2 \times E/2 = E$ |
| | $I = \frac{E}{2R} = 25 \text{ mA}$ | $I = 0$ |
| $2T_D < 1 < T_W$ | $V = E$ | $V = E$ |
| | $I = \frac{E - E}{E + Z_0} = 0$ | $I = 0$ |

$0 < 1 < T_W$  Average Power Dissipation (Sending and Receiving)

$= (5 \text{ V} \times 25 \text{ mA}) \times \frac{2T_D}{T_W} = 23.4 \text{ mW (max length)}$ $= \frac{1}{2} \times 23.4 \text{ mW} = 11.7 \text{ mW (average length)}$ $= \frac{1}{2} \times 11.7 \text{ mW} = 5.85 \text{ mW (average length)}$ 50% transmit 50% receive Under the above conditions, assume that the one-way transit time for a signal sent from the sending end (driver 3020) to be received at the receiving end (transceiver 3010) is $T_D$; and that the round trip transmit time for the transmit signal to be sent and reflected back to the driver is $2T_D$; then during the time "t" is smaller than $2T_D$ the transmission line appears infinitely long to the transmitter circuit (driver 3020) causing only half of the driver voltage E to be applied to the line. This is because the output impedance seen by the driver during this time period $t < 2T_D$ is $Z_0$, thus a 2:1 attenuator is formed by the ratio of the line impedance $Z_0 = 100$ ohms and the internal impedance of driver 3020 = 100 ohms. Thus, assuming a driver voltage of 5 volts, at a time, $t < 2T_D$; the voltage V on the line 20 is 5/2 or 2.5 volts, as shown in curve A of FIG. 3.

Figure 3:
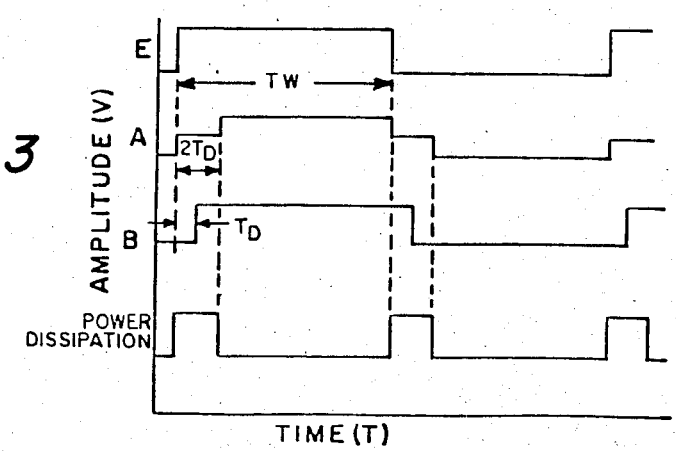
FIG. 3 is a timing diagram showing the waveforms at certain points of time and as propagated along the transmission line 20 of FIGS. 1 and 2.

When this voltage V of 2.5 volts arrives at the receiving end (driver 3020) at time $t = T_D$, the open circuit at the receiver end causes V to double to $2 \times E/2$ or 5 volts and return to the sending end as shown in curve B of FIG. 3.

When the reflection from the receiving end arrives at the sending end at $t = 2T_D$, the transmission line voltage V at that end becomes $E/2 + E/2 = E$, or 5 volts, reducing the current and power into the line to zero at $t = 2T_D$ since current cannot flow without a voltage difference across the line and, as shown in curves A and B, the voltage at both ends at $2T_D<t<T_W$ is the same. During a time period less than the transmitted pulse width, $T_W$, of 3.2 μs, the power dissipation is 23.4 mW for a line length of 300 feet. Line attenuation, which is small, is neglected in this example. The resulting crosstalk into an adjacent twisted pair in the same sleeve is several millivolts but this can be tolerated by the line, which has a 5 volt noise immunity when driven differentially with a 0 V to +5 V logic signal.

It should be emphasized that the line driver 3020 dissipates power only during logical transitions, at which time the driver delivers curent to charge or discharge the line 20. As may be seen in FIG. 2, current $I_1$ flows through $R_1$, $P_1$, $Z_0$, $R_3$ and $N_2$ to ground to charge the line represented by $Z_0$; whereas for discharge current $I_2$ flows from +5 V through $R_2$, $P_2$, $Z_0$, $R_4$ and $N_1$ to ground.

In FIG. 1 the N transistor 3040 of receiver 3010 forms a current source which is switched between the two N transistors 3006 and 3007 connected to the twisted pair 20. In FIG. 2, resistors R1–R4 represent the stray resistances of the driver 3020 transistors which provide the output impedance to match the line impedance $Z_0$.

II. Two Wire Bidirectional Transmission

In the transmission circuit described in connection with FIGS. 1-3 transmission in one direction occurred during one frame and in the other direction in another frame. In the following alternate embodiment, transmission and reception of signals is provided over the same pair of wires at the same time.

Figure 4:
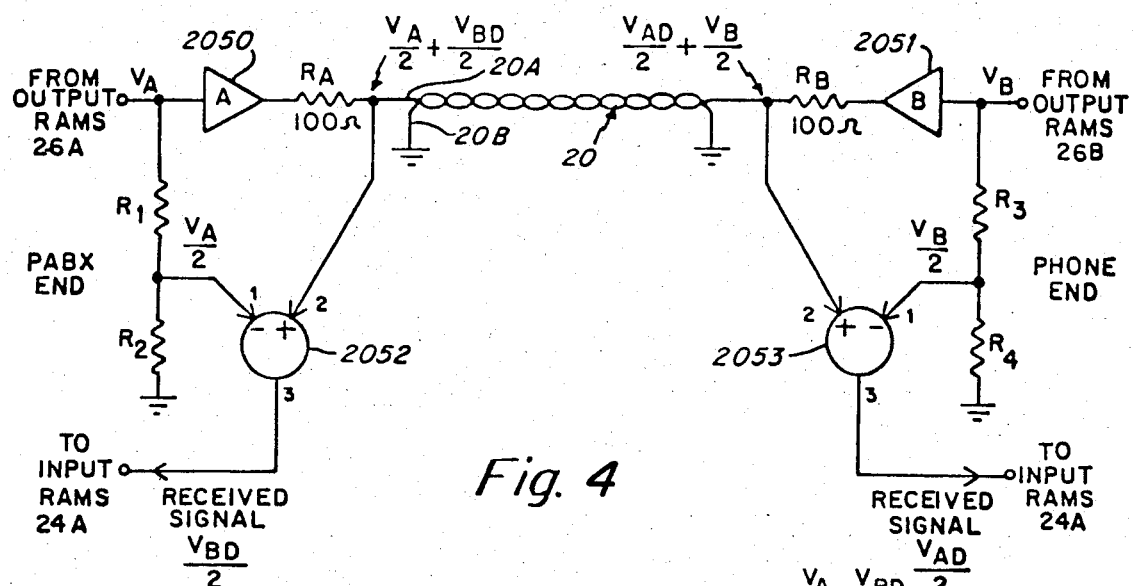
FIG. 4 is a schematic diagram of a bidirectional transmission circuit in accordance with the invention.

The circuit for this two wire bidirectional transmission circuit is shown in FIG. 4 to comprise a line driver 2050 at terminal A; and a line driver 2051 at terminal B. Note that terminal A may comprise a PABX and terminal B the telephones or vice versa. The output of line driver 2050 is coupled through terminating resistor $R_A$ to lines 20A of twisted pair 20. $R_A$ has an impedance of 100 ohms matched to the impedance $Z_0$ of line 20. Likewise, line driver 2051 at terminal B is coupled through impedance matching resistor $R_B$ to line 20A of twisted pair transmission line 20. The remaining line 20B of the pair 20 is grounded at both ends, as shown.

The A terminal end of line 20A is also coupled to the plus terminal of a subtracting circuit 2052. The negative terminal of subtractor 2052 is provided with an input voltage VA/2 from the midpoint of a voltage divider network comprising $R_1$ and $R_2$ coupled in series between ground and the input terminal of line driver 2050. Similarly, the B terminal end of line 20A is coupled to the plus input terminal 2 of subtractor 2053, while the negative input terminal 1 is coupled to the midpoint of a voltage divider network comprising resistors $R_3$ and $R_4$ which divides the input voltage VB at the input to line driver 2051 in half, i.e., VB/2. The output at terminal 3 of subtractors 2051 and 2053 is the linear vector difference between the inputs at terminals 1 and 2.

The input to line driver 2050 may comprise a bit stream of digital pulses of amplitude VA, while the received signal VBD/2 may comprise the input bit stream.

The circuit of FIG. 4 takes advantage of the fact that:
a. the transmitted and received signals add linearly at each end of the transmission line 20, and
b. the transmitted component can be recreated and subtracted from the combined signal to provide the received component.

The output from driver 2050, VA, is attenuated by a factor of two since $R_A$ and $Z_0$ form a 2:1 attenuator. Similarly, the input from the B terminal on the right side of the line 20 is VB/2. When VB/2 arrives at the A side, it adds to the A driver signal VA/2 and the combined output at the A side of the transmission line 20 becomes VA/2+VBD/2 where VBD/2 is the delayed and attenuated version of VB/2. Similarly on the B side of the transmission line the voltage is VAD/2+VB/2, where VAD is the delayed and attenuated version of VA. By subtracting VB/2 from VAD/2+VB/2 in subtractor 2053 the desired received signal output VAD/2 is obtained.

The subtractors 2052 and 2053 must be linear since the two signals form an analog addition. One way of implementing such a subtractor is shown in FIG. 5.

Figure 5:
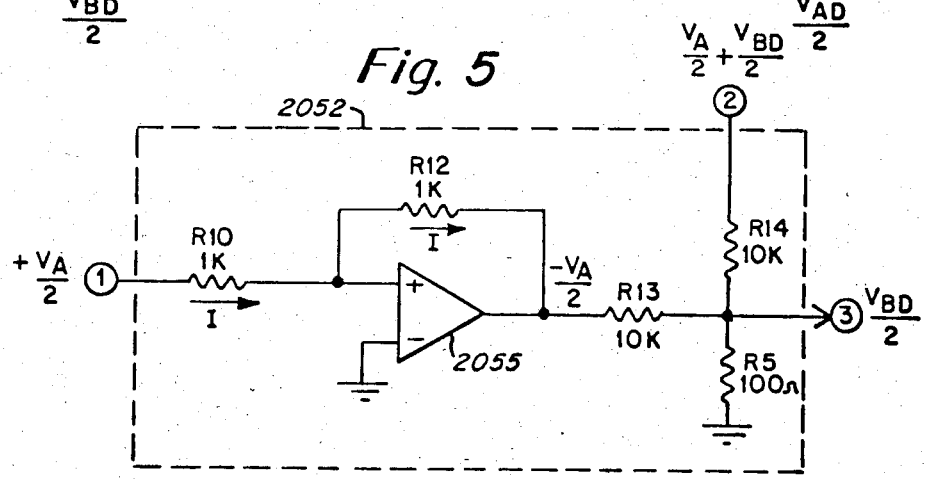
FIG. 5 is a schematic diagram of the subtractor circuit utilized in FIG. 4.

As shown in FIG. 5, the subtractor 2052 of FIG. 4 may comprise a high gain differential amplifier 2055 which provides at its output the negative of its input. Thus, the input to terminal 1, +VA/2, is coupled through R10 a 1000 ohm resistor to the plus terminal of amplifier 2055; while the negative terminal is grounded. The output of amplifier 2055 is fed back through R12, a 1000 ohm resistor to the plus terminal producing at the output terminal −VA/2. The signal −VA/2 is summed at R5 with the signal VA/2+VBD/2 at terminal 2. Summation occurs because R5 has a much smaller resistance (100 ohms) than R14 (10K ohms) and R14 equals R13. The resulting output at terminal 3 is thus VBD/2.

Figure 6:
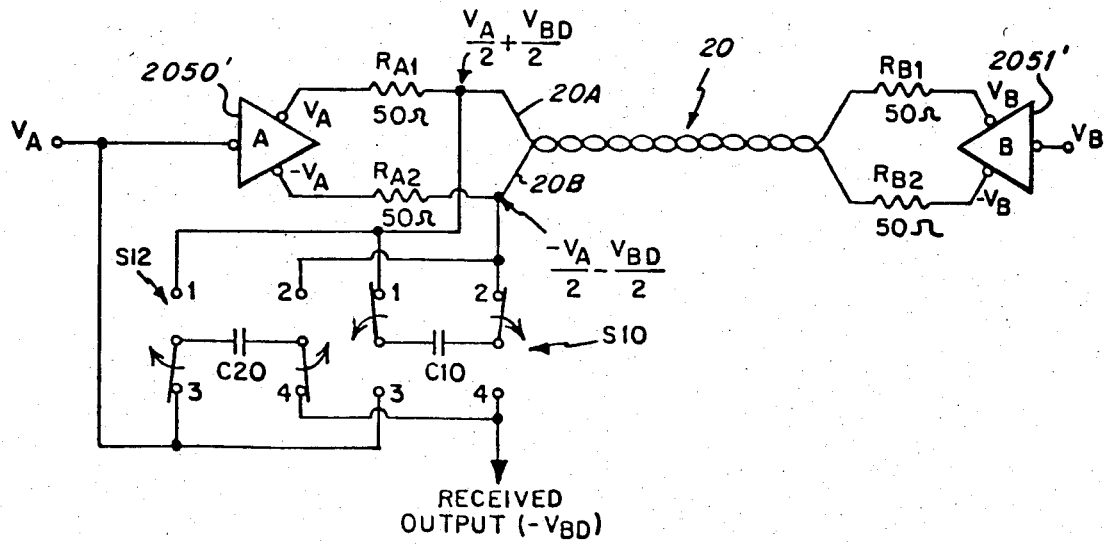
FIG. 6 is a schematic diagram of a bidirectional transmission system with differential drive in accordance with the invention.

FIG. 6 shows how bidirectional transmission can be achieved with a balanced differential drive. In FIG. 6, a twisted pair 20 is being driven at each end by two differential drivers, 2050′ and 2051′. The output impedance of each driver must equal the line impedance $Z_0$ for proper line termination. Operation is basically the same as in FIG. 4 wherein the input VA or VB is subtracted from the combined signals. However, due to differential operation, a different scheme is employed in obtaining subtraction.

Figure 7:
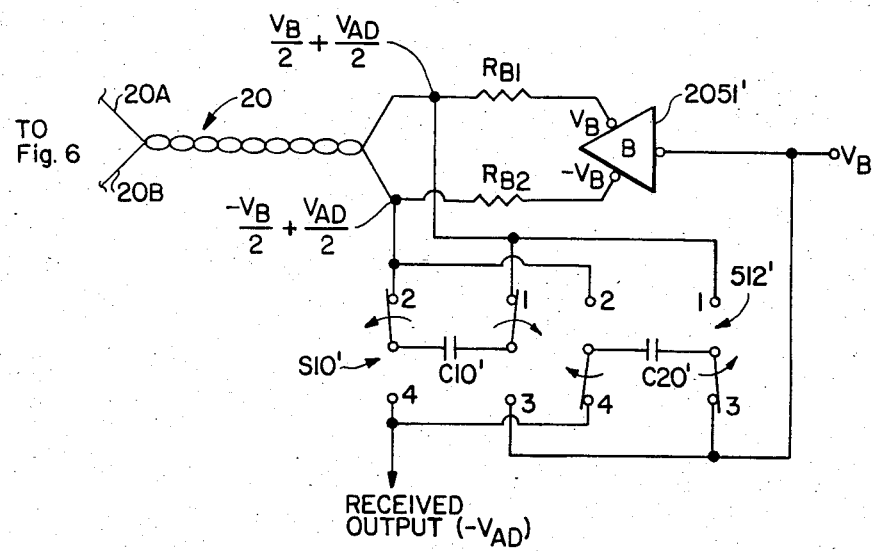
FIG. 7 is a schematic diagram as in FIG. 6 showing the details of the B terminal side of the transmission system.

This is accomplished by alternately switching capacitors C10 and C20 between terminals 1-2 and 3-4 by means of switches S10 and S12. For example, when capacitor C10 is connected across terminals 1-2, it charges with the differential line voltage. When C10 is then switched to terminals 3-4 the differential line voltage is subtracted from the terminal A input VA, thus providing −VB. During the time C10 is connected to terminal 3-4, C20 is being charged with the differential line voltage. The capacitors must switch at about 5 times the transmission bit rate. The switches S10 and S12 may preferably comprise MOS transistors which can be switched at the rates of several megahertz. The same circuit for subtraction is intended to be used at the B terminal side of the line 20 used on the right side of the line. This circuit is shown in FIG. 7 wherein like items are identically labelled with a prime suffix added.

EQUIVALENTS

While what has been described constitutes the presently most preferred embodiment of the invention, it can be varied in many ways, as is apparent from the above discussion, and the invention should, therefore, only be limited insofar as is required by the scope of the following claims.

We claim:
1. A twisted pair two wire bidirectional transmission system for transmitting electrical signals simultaneously in opposite directions between first and second termi- nals connected at opposite ends to said twisted pair of two wires comprising:
  a. a transmitter at the first terminal for generating a voltage signal VA onto a first one of said wires and the negative of said VA signal onto the second of said wires;
  b. a transmitter at the second terminal for generating a voltage signal VB onto a first one of said wires and the negative of said VB signal onto the second of said wires;
  c. a first pair of capacitor means at said first terminal each capacitor of said pair being alternately coupled across said wires at the first terminal end and in series with said voltage signal VA to produce a delayed and attenuated version of the VB signal at the first terminal; and
  d. a second pair of capacitor means at said second terminal each capacitor of said pair being alternately coupled across said wires at the second terminal end and in series with said voltage signal VB to produce a delayed and attenuated version of the VA signal at the second terminal.

2. The system of claim 1 wherein the transmitters at each end comprises balanced differential drivers.

3. The system of claim 2 wherein the output impedance of each driver equals the characteristic impedance of the transmission line formed by the two wires.

4. The system of claim 1 wherein the voltage signals are transmitted at a predetermined bit rate and switching means are provided at each of said first and second terminals for alternately coupling each capacitor of said pair at a rate of at least equal to the bit rate of the transmitted signals.

5. A twisted pair two wire bidirectional transmission system for transmitting electrical signals simultaneously in opposite directions between first and second terminals connected at opposite ends to said twisted pair of two wires comprising:
  a. a transmitter at the first terminal for generating a voltage signal VA onto a first one of said wires and the negative of said VA signal onto the second of said wires;
  b. a transmitter at the second terminal for generating a voltage signal VB onto a first one of said wires and the negative of said VB signal onto the second of said wires;
  c. capacitor means at said first terminal periodically coupled across said wires at the first terminal end and in series with said voltage signal VA to produce a delayed and attenuated version of the VB signal at the first terminal; and
  d. capacitor means at said second terminal periodically coupled across said wires at the second terminal end and in series with said voltage signal VB to produce a delayed and attenuated version of the VA signal at the second terminal.

* * * * *